US012198596B2

(12) United States Patent
Park et al.

(10) Patent No.: US 12,198,596 B2
(45) Date of Patent: *Jan. 14, 2025

(54) DISPLAY DRIVING APPARATUS HAVING MURA COMPENSATION FUNCTION AND METHOD OF COMPENSATING FOR MURA OF THE SAME

(71) Applicant: LX SEMICON CO., LTD., Daejeon (KR)

(72) Inventors: Jun Young Park, Daejeon (KR); Min Ji Lee, Daejeon (KR); Gang Won Lee, Daejeon (KR); Young Kyun Kim, Daejeon (KR); Ji Won Lee, Daejeon (KR); Jung Hyun Kim, Daejeon (KR); Suk Ju Kang, Daejeon (KR); Sung In Cho, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,581

(22) Filed: Oct. 25, 2023

(65) Prior Publication Data

US 2024/0071278 A1 Feb. 29, 2024

Related U.S. Application Data

(63) Continuation of application No. 17/964,678, filed on Oct. 12, 2022, now Pat. No. 11,837,141.

(30) Foreign Application Priority Data

Oct. 14, 2021 (KR) ........................ 10-2021-0136445

(51) Int. Cl.
*G09G 3/20* (2006.01)

(52) U.S. Cl.
CPC ... *G09G 3/2007* (2013.01); *G09G 2320/0233* (2013.01); *G09G 2360/16* (2013.01)

(58) Field of Classification Search
CPC ......... G09G 3/2007; G09G 2320/0233; G09G 2360/16
See application file for complete search history.

(56) References Cited

U.S. PATENT DOCUMENTS

| | | | | |
|---|---|---|---|---|
| 10,964,241 | B2 * | 3/2021 | Kim | G09G 3/006 |
| 11,450,267 | B2 | 9/2022 | Han et al. | |
| 2021/0327343 | A1 | 10/2021 | Han et al. | |

FOREIGN PATENT DOCUMENTS

| | | | |
|---|---|---|---|
| JP | 2018-194842 | A | 12/2018 |
| KR | 2020-0068321 | A | 6/2020 |
| KR | 2021-0109073 | A | 9/2021 |

* cited by examiner

*Primary Examiner* — Gene W Lee
(74) *Attorney, Agent, or Firm* — POLSINELLI PC

(57) ABSTRACT

A display apparatus having a mura compensation function includes a mura memory in which compensation data corresponding to coefficient values of a mura compensation equation is stored; and a mura compensation circuit configured to perform mura compensations on display data by using the mura compensation equation to which the compensation data has been applied, wherein the coefficient values are set so that the mura compensation equation has been fit to have a curve that satisfies known difference values of selected gray levels, a first estimation difference value of a first estimation gray level higher than the selected gray levels, and a second estimation difference value of a second estimation gray level lower than the selected gray levels, and wherein the compensation data comprises the coefficient values of the mura compensation equation in which all of the known difference values of the selected gray levels, the first (Continued)

estimation difference value, and the second estimation difference value have a difference within a preset error range.

20 Claims, 8 Drawing Sheets

DISPLAY DRIVING APPARATUS HAVING MURA COMPENSATION FUNCTION AND METHOD OF COMPENSATING FOR MURA OF THE SAME

CROSS-REFERENCE TO RELATED APPLICATION

This application is a continuation of U.S. patent application Ser. No. 17/964,678, filed on Oct. 12, 2022, which claims the priority of Korean Patent Application No. 10-2021-0136445, filed on Oct. 14, 2021, which are hereby incorporated by reference in their entirety.

BACKGROUND

Field of the Disclosure

The present disclosure relates to compensation for mura in a display, and more particularly, to a display driving apparatus having a mura compensation function for compensating for mura by using compensation data of a mura compensation equation and a method of compensating for mura of the display driving apparatus.

Description of the Background

Recently, an LCD panel or an OLED panel is used as a display panel.

The display panel may have a defect, such as mura, for a reason such as an error in a manufacturing process. Mura means a defect in which a pixel of a given display does not emit light with targeted accurate brightness in accordance with data. Mura may be present in a way to have irregular brightness in a display image in the form of a spot in a pixel or some region.

To accurately compensate for mura, there is a need for compensation data having all gray levels that are represented in pixels. However, to apply the compensation to all the pixels of a display panel, there is a need for a high-capacity memory capable of storing the compensation data having all the gray levels for all the pixels.

Accordingly, a common mura compensation method may include steps of calculating difference values between pieces of brightness according to mura in selected gray levels of all gray levels included in a gray level range, modeling a mura compensation equation based on the calculated difference values, and calculating a compensation value for a subsequent arbitrary gray level by using the mura compensation equation.

In the common mura compensation method, the mura compensation equation may be modeled by using difference values between pieces of brightness of some selected gray levels that belong to all the gray levels and that correspond to a middle gray level range between a minimum gray level and a maximum gray level.

If mura compensations are performed by using the mura compensation equation, difference values between pieces of brightness of a minimum gray level, gray levels around the minimum gray level, a maximum gray level, and gray levels around the maximum gray level may be compensated for by compensation values that are calculated by the mura compensation equation.

However, in the mura compensation equation modeled based on some selected gray levels, compensation values for a minimum gray level, gray levels around the minimum gray level, a maximum gray level, and gray levels around the maximum gray level are greatly different from a difference value for brightness that is necessary for actual mura compensations.

Accordingly, according to the common mura compensation method, mura compensation results having significantly degraded performance may be obtained.

For such a reason, it is necessary to develop a mura compensation method capable of accurately compensating for mura in all gray levels including a maximum gray level and a minimum gray level.

SUMMARY

Accordingly, the present disclosure is directed to a display driving apparatus having a mura compensation function for compensating and a method of compensating for mura of the same that substantially obviate one or more of problems due to limitations and disadvantages described above.

More specifically, the present disclosure is to provide a display driving apparatus having a mura compensation function, which may accurately compensate for mura in all gray levels including a maximum gray level and a minimum gray level and a method of compensating for mura of the display driving apparatus.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display apparatus having a mura compensation function includes a mura memory in which compensation data corresponding to coefficient values of a mura compensation equation is stored; and a mura compensation circuit configured to perform mura compensations on display data by using the mura compensation equation to which the compensation data has been applied, wherein the coefficient values are set so that the mura compensation equation has been fit to have a curve that satisfies known difference values of selected gray levels, a first estimation difference value of a first estimation gray level higher than the selected gray levels, and a second estimation difference value of a second estimation gray level lower than the selected gray levels, and wherein the compensation data comprises the coefficient values of the mura compensation equation in which all of the known difference values of the selected gray levels, the first estimation difference value, and the second estimation difference value have a difference within a preset error range.

In another aspect of the present disclosure, a display apparatus having a mura compensation function includes a mura memory in which compensation data corresponding to coefficient values of a mura compensation equation is stored; and a mura compensation circuit configured to perform mura compensations on display data by using the mura compensation equation to which the compensation data has been applied, wherein the coefficient values are set so that the mura compensation equation has been fit to have a curve that satisfies known difference values of selected gray levels, a first estimation difference value of a first estimation gray level higher than the selected gray levels, and a second estimation difference value of a second estimation gray level lower than the selected gray levels, and wherein the first estimation difference value and the second estimation difference value are values generated through extrapolation which uses the known difference values of the selected gray levels and which is performed by using a multilayer perceptron method.

In another aspect of the present disclosure, a display apparatus includes a mura memory in which data related to a mura compensation equation is stored; and a mura compensation circuit configured to perform mura compensations on display data by using the mura compensation equation, wherein the mura compensation equation is modified after being generated based on difference values of selected gray levels due to mura, and wherein the modified mura compensation equation is obtained based on estimation difference values and the difference values of the selected gray levels, the estimation difference values being for the extension gray levels which is not included the range of the selected gray levels.

In a further aspect of the present disclosure, a mura compensation method includes obtaining difference values of selected gray levels due to mura; generating a mura compensation equation based on the difference values; obtaining estimation difference values for extension gray levels which are not included the range of the selected gray levels; and modifying the mura compensation equation based on the estimation difference values of the extension gray levels and the difference values of the selected gray levels.

According to various aspects of the present disclosure, it is possible to calculate a mura compensation equation that has been fit for some selected gray levels, including an estimation gray level higher than preset selected gray levels, preferably, a maximum gray level and an estimation gray level lower than the preset selected gray levels, preferably, a minimum gray level.

According to various aspects of the present disclosure, it is possible to obtain accurate mura compensation data for all gray levels and to significantly improve mura compensation performance.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

A display driving apparatus of the present disclosure is for driving a display panel, such as an LCD panel or an OLED panel.

An aspect of the display driving apparatus of the present disclosure is constructed to receive display data that is transmitted by a timing controller (not illustrated) in the form of a data packet and to provide a display panel with an analog display signal corresponding to the display data.

An aspect of the display driving apparatus of the present disclosure may be described with reference to FIG. 1.

Figure 1:
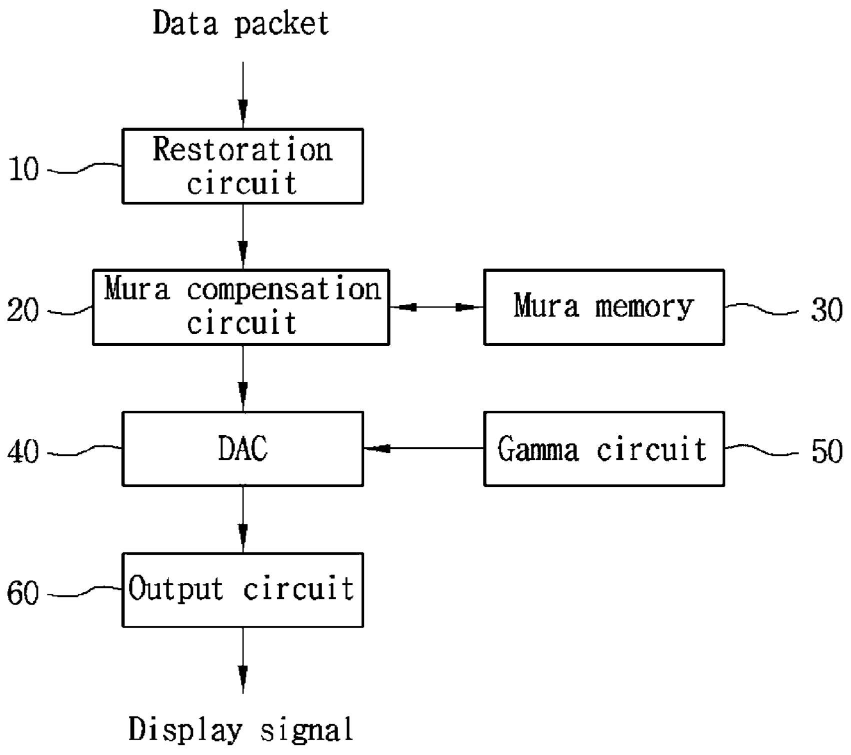
FIG. 1 is a block diagram illustrating a preferred aspect of a display driving apparatus having a mura compensation function according to the present disclosure.

In FIG. 1, the display driving apparatus may include a restoration circuit 10, a mura compensation circuit 20, a mura memory 30, a digital-to-analog converter (DAC) 40, a gamma circuit 50, and an output circuit 60.

The restoration circuit 10 receives display data that is transmitted by being included in a data packet, and restores the display data from the data packet. The data packet may include the display data, a clock, and control data.

The restoration circuit 10 may restore the clock from the data packet, and may restore the display data from the data packet by using the restored clock. The control data may be restored by using the same method as a method of restoring the display data.

The restored clock, display data, and control data may be provided to required parts within the display driving apparatus.

An aspect of the present disclosure illustrates a construction for compensating for display data to compensate for mura, and the writing and description of constructions related to the processing a clock and control data are omitted.

For a mura compensation function, the display driving apparatus according to an aspect of the present disclosure includes the mura compensation circuit 20 and the mura memory 30.

The mura compensation circuit 20 may store a mura compensation equation, may receive display data from the restoration circuit 10, and may receive compensation data for each pixel from the mura memory 30. The mura compensation equation may be represented as a secondary function, for example.

The mura memory 30 may store compensation data for being put into coefficients of a mura compensation equation. The compensation data may include coefficient values for each pixel. The mura memory 30 may provide compensation data for each pixel in response to a request from the mura compensation circuit 20.

Mura may appear in a pixel, a block circuit, or the entire screen of a display panel, and may be compensated for each pixel, for example. Mura compensations may be represented as de-mura.

Compensation data of the mura memory 30 may be stored to have location information of a display panel in a way to correspond to each pixel. The mura compensation circuit 20 may request compensation data from the mura memory 30 by using location information of a pixel. The location information of the pixel may be constructed to represent location values of a row and column of the display panel.

The mura compensation circuit 20 may output display data having mura compensated for by applying compensation data of the mura memory 30 to coefficients of a mura compensation equation and applying received display data to a variable of the mura compensation equation. It may be understood that the display data having mura compensated for has a value for improving brightness of a pixel for mura compensations. To this end, coefficient values of a specific pixel that are stored as compensation data may be set so that a mura compensation equation, that is, a secondary function, is set to have a fit curve for mura compensations.

The mura compensation circuit 20 outputs, to the DAC 40, display data compensated as compensation data.

The gamma circuit 50 is constructed to provide the DAC 40 with a gamma voltage corresponding to each gray level.

The DAC 40 receives display data from the mura compensation circuit 20, and receives gamma voltages for gray levels within a gray level range from the gamma circuit 50.

It may be understood that the gray level range includes the number of gray levels corresponding to preset resolution. In the gray level range, a gray level having the highest brightness may be defined as a maximum gray level, and a gray level having the lowest brightness may be defined as a minimum gray level. For example, if a gray level range includes 256 gray levels, a gray level 0 to a gray level 255 are included in the gray level range, a maximum gray level is the gray level 255, and a minimum gray level is the gray level 0.

In FIG. 1, the DAC 40 has been simply illustrated for convenience of description, and may include a latch (not illustrated) and a digital analog converter (not illustrated). The latch latches display data. The digital analog converter converts the latched display data into an analog signal by using gamma voltages.

The DAC 40 selects a gamma voltage corresponding to a digital value of display data and outputs an analog signal corresponding to the gamma voltage, through the construction.

The output circuit 60 is constructed to output a display signal by driving the analog signal of the DAC 40. The output circuit 60 may be constructed to include an output buffer that outputs the display signal by amplifying the analog signal, for example.

According to an aspect of the present disclosure, compensation data may be generated by calculating estimation difference values of extension gray levels through extrapolation that uses known difference values between pieces of brightness of preset selected gray levels and fitting a mura compensation equation so that the estimation difference values of the extension gray levels and difference values of the selected gray levels are satisfied.

In an aspect of the present disclosure, an extension gray level higher than selected gray levels is represented as a first estimation gray level. An extension gray level lower than the selected gray levels is represented as a second estimation gray level.

A method of generating compensation data may be described with reference to FIG. 2.

Figure 2:
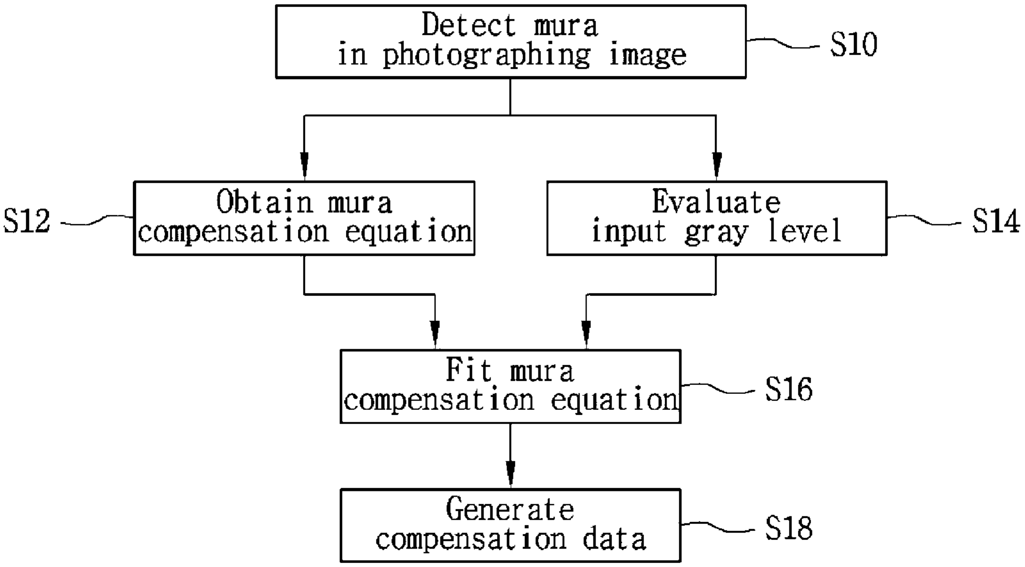
FIG. 2 is a flowchart describing a method of generating compensation data.

Referring to FIG. 2, compensation data may be generated through step S10 of detecting mura in a photographing image, step S12 of obtaining a mura compensation equation, step S14 of evaluating an input gray level, step S16 of fitting the mura compensation equation, and step S18 of generating compensation data.

Step S10 of detecting mura in a photographing image is for securing a photographing image and detecting mura in the photographing image.

Input data for a test may be provided to a display panel to secure a photographing image. The input data is provided to the display panel so that an image frame for a plurality of gray levels is formed. The display panel displays a test screen for each of the plurality of gray levels.

A plurality of gray levels selected for a test may be represented as selected gray levels.

For example, in a gray level range including 256 gray levels, 16 gray levels, 32 gray levels, 64 gray levels, 128 gray levels, or 192 gray levels may be set as selected gray levels. The selected gray levels are optimum gray levels for compensating for mura in the gray level range, and may be set as gray levels determined by a manufacturer.

Input data corresponding to selected gray levels may be sequentially provided to a display panel. A test screen corresponding to the selected gray levels may be sequentially displayed on the display panel.

Photographing images for detecting mura may be secured by sequentially photographing test screens of a display panel. The photographing images may be captured by a fixed high-performance camera.

It may be understood that photographing images are secured for each selected gray level. Furthermore, mura in a photographing image may be detected for each selected gray level with respect to each of pixels of a display panel. If brightness of a photographing image at a location corresponding to a pixel is different from brightness that needs to be represented by input data, it is determined that mura is present in the corresponding pixel.

Mura for each selected gray level of each of pixels may be determined by the method. Difference values between pieces of brightness for each selected gray level of a pixel may be calculated. In the following description, difference values may be understood as brightness difference values.

Figure 3:
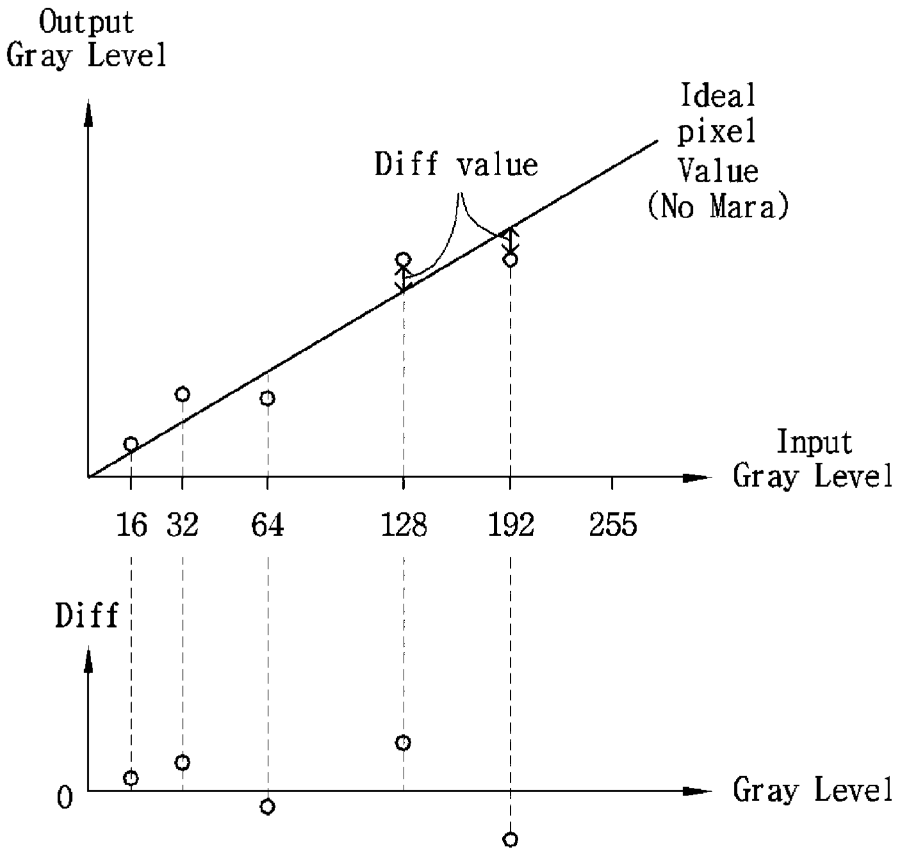
FIG. 3 is a graph for describing a difference value between pieces of brightness.

Difference values for each selected gray level of a pixel may be calculated as in FIG. 3.

An upper graph in FIG. 3 illustrates comparisons between input gray levels and output gray levels according to input data. A lower graph in FIG. 3 illustrates a distribution of difference values of gray levels according to mura on the basis of brightness (input gray levels) that needs to be represented by input data in a photographing image.

In FIG. 3, a line that represents ideal pixel values illustrates ideal values at which output gray levels need to be formed in accordance with input gray levels when mura is not present (No Mura). A difference value (Diff value) means a value corresponding to a brightness difference between an input gray level and an actual output gray level.

When difference values of selected gray levels corresponding to a pixel are calculated as in FIG. 3, step S12 of calculating a mura compensation equation that models a mura compensation equation for a pixel based on the difference values may be performed.

It may be understood that the mura compensation equation in step S12 has been modeled by using difference values of selected gray levels.

However, if display data having a gray level smaller than or greater than selected gray levels is compensated for, the mura compensation equation calculated in step S12 may compensate for display data so that the display data has a value greatly different from a difference value necessary for mura compensations.

More specifically, in a minimum gray level and gray levels around the minimum gray level or a maximum gray level and gray levels around the maximum gray level, display data may be compensated for in a way to have a value greatly different from a difference value necessary for mura compensations.

To solve such a problem, in an aspect of the present disclosure, step S14 of evaluating an input gray level and step S16 of fitting a mura compensation equation are performed. Compensation data according to an aspect of the present disclosure may be generated as the results of the fitting of the mura compensation equation in step S16.

In an aspect of the present disclosure, compensation data may be generated by calculating estimation difference values of extension gray levels through extrapolation using known difference values of selected gray levels and fitting a mura compensation equation so that the estimation difference values of the extension gray levels and the difference values of the selected gray levels are satisfied.

In an aspect of the present disclosure, in step S14 of evaluating an input gray level, extrapolation for estimating an estimation difference value of an extension gray level by using difference values of selected gray levels may be performed.

The extrapolation includes first extrapolation and second extrapolation. The first extrapolation may be defined as calculating a first estimation difference value of a first estimation gray level higher than selected gray levels from known difference values of the selected gray levels. The second extrapolation may be defined as calculating a second estimation difference value of a second estimation gray level lower than selected gray levels based on the known difference values of the selected gray levels.

In an aspect of the present disclosure, when the first estimation difference value and the second estimation difference value are calculated by the extrapolation, a mura compensation equation may be fit (S16). In this case, the mura compensation equation is fit to have coefficient values so that all of difference values of the selected gray levels, the first estimation difference value, and the second estimation difference value have differences within a preset error range.

The coefficient values of the mura compensation equation that has been fit in step S16 may be generated as compensation data (S18).

The compensation data includes the coefficient values of the mura compensation equation that are set for each pixel for mura compensations. That is, the coefficient values correspond to coefficients of the mura compensation equation that has been fit to have a curve that satisfies the known difference values of the selected gray levels, the first estimation difference value of the first estimation gray level higher than the selected gray levels, and the second estimation difference value of the second estimation gray level lower than the selected gray levels.

In this case, a first estimation gray level may be set as a maximum gray level in a gray level range, and a difference value of the first estimation gray level may be the first estimation difference value. In the case of 256 gray levels, a 255 gray level, that is, a maximum gray level, may be set as the first estimation gray level. Furthermore, a second estimation gray level may be set as a minimum gray level in the gray level range. A difference value of the second estimation gray level may be the second estimation difference value. In the case of 256 gray levels, a 0 gray level, that is, a minimum gray level, may be set as the second estimation gray level.

It may be understood that compensation data includes coefficient values of a mura compensation equation satisfying that all display data compensated for by the mura compensation equation has a difference within a preset error range with respect to all of difference values of selected gray levels, a first estimation difference value, and a second estimation difference value.

The compensation data may be constructed in the form of a lookup table in which the coefficient values for each gray level are matched for each pixel. The compensation data may be stored in the mura memory 30 of FIG. 1.

Figure 4:
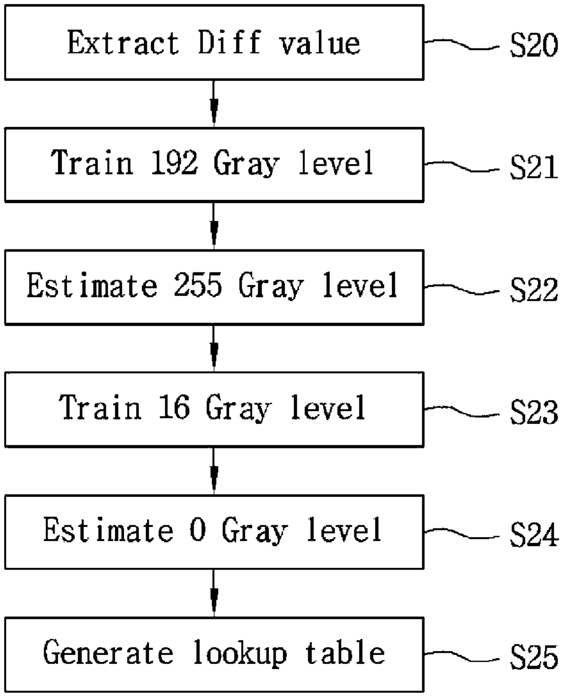
FIG. 4 is a flowchart describing a mura compensation method of the present disclosure.

To calculate compensation data through step S14 and step S16 in FIG. 2 corresponds to a mura compensation method of the present disclosure in FIG. 4.

A mura compensation method of generating compensation data based on difference values of selected gray levels according to the present disclosure is described with reference to FIG. 4.

A mura compensation method of the present disclosure may be illustrated as including step S20 of extracting difference values (Diff values) of selected gray levels, step S21 of training a first target value of a 192 gray level, step S22 of estimating a first estimation difference value of a 255 gray level, step S23 of training a second target value of a 16 gray level, step S24 of estimating a second estimation difference value of a 0 gray level, and step S25 of generating a lookup table.

Step S20 is to calculate difference values of selected gray levels corresponding to a pixel as in FIG. 3. This has been described in detail with reference to FIGS. 2 and 3, and a description thereof is omitted.

Step S21 to step S24 correspond to calculating a first estimation difference value and a second estimation difference value through extrapolation. More specifically, the extrapolation in step S21 to step S24 is performed according to a multilayer perceptron method using difference values of selected gray levels as inputs thereof, and is to calculate the first estimation difference value and the second estimation difference value.

Step S25 corresponds to calculating compensation data in the form of a lookup table based on the difference values of the selected gray levels, the first estimation difference value of the first estimation gray level, and the second estimation difference value of the second estimation gray level.

As described above, step S21 and step S22 correspond to the first extrapolation. The first extrapolation is to calculate a first estimation difference value of a first estimation gray level higher than the selected gray levels, that is, the 255 gray level, based on known difference values of the selected gray levels.

The first extrapolation may be described with reference to FIGS. 5 and 7.

Figure 5:
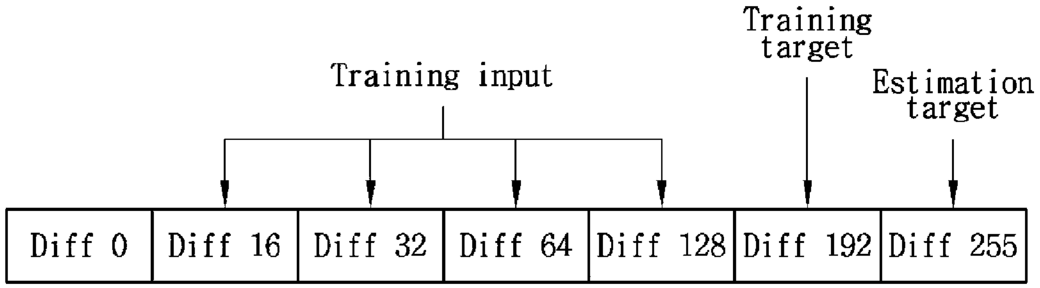
FIG. 5 is a diagram for describing first extrapolation.

In FIG. 5, a difference value of a 0 gray level is indicated as Diff 0, a difference value of a 16 gray level is indicated as Diff 16, a difference value of a 32 gray level is indicated as Diff 32, a difference value of a 64 gray level is indicated as Diff 64, a difference value of a 128 gray level is indicated as Diff 128, a difference value of a 192 gray level is indicated as Diff 192, and a difference value of a 255 gray level is indicated as Diff 255.

The 0 gray level, the 16 gray level, the 32 gray level, the 64 gray level, the 128 gray level, and the 192 gray level among the gray levels are included in selected gray levels.

In the selected gray levels, the 192 gray level that is the highest gray level, may be set as a first selection gray level. In the gray level range, the 255 gray level may be set as a first estimation gray level. The difference value of the 192 gray level may be used as a training target, and may be set as a target value for training. Furthermore, the difference values of the remaining selected gray levels, that is, the 16 gray level, the 32 gray level, the 64 gray level, and the 128 gray level may be used as training inputs. Furthermore, a first estimation difference value of the 255 gray level is used as an estimation target.

In the above description, the difference values of the 16 gray level, the 32 gray level, the 64 gray level, the 128 gray level, and the 192 gray level included in the selected gray levels are known values.

In step S21 for the first extrapolation, the difference value of the 192 gray level among the selected gray levels is set as a first target value. A first training value of the 192 gray level is calculated according to a multilayer perceptron method using difference values of the remaining selected gray levels as a training input.

In the first extrapolation, known difference values of the 16 gray level, the 32 gray level, the 64 gray level, and the 128 gray level are used as a training input for a multilayer perceptron. The first training value of the 192 gray level is calculated through the multilayer perceptron. The multilayer perceptron is for calculating the first training value that is close to the known difference value of the 192 gray level with a difference within a preset error range.

In the first extrapolation, when the first training value that is close to the difference value of the 192 gray level, that is, a target value with a difference within a preset error range, is calculated through the training, first weights of inputs to nodes for each layer of the multilayer perceptron that has generated the first training value may be stored.

Figure 7:
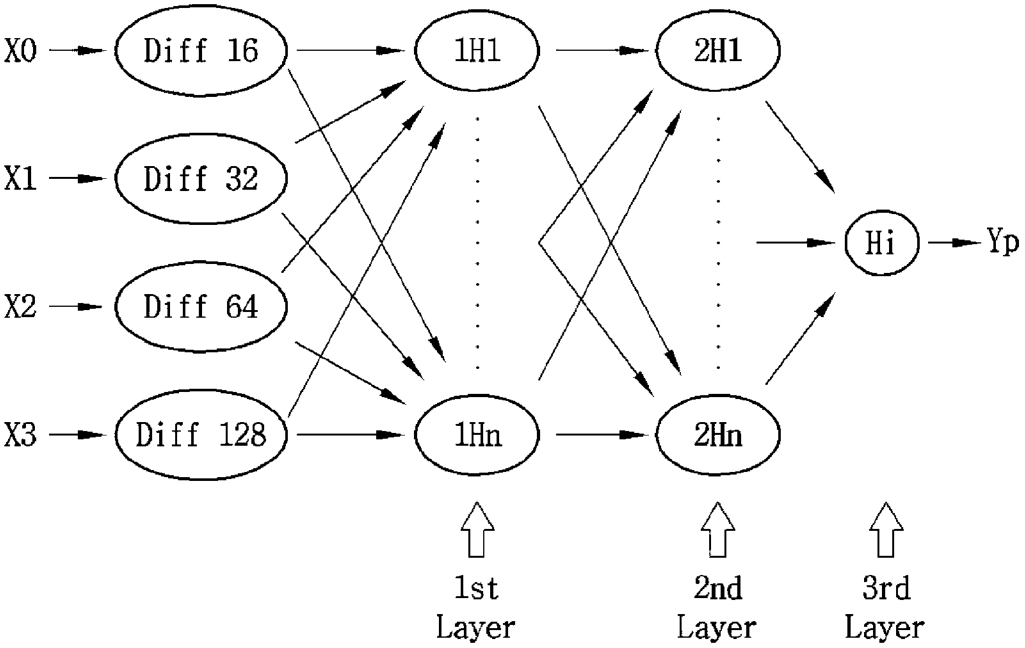
FIG. 7 is a diagram for describing a multilayer perceptron method.

As in FIG. 7, the multilayer perceptron has a multilayer structure including an input layer ($1^{st}$ Layer), a middle layer (hidden layer) ($2^{nd}$ Layer), and an output layer ($3^{rd}$ Layer). The input layer ($1^{st}$ Layer) is a layer to which a training input is provided, and plays a role to transfer, to a next layer results corresponding to the training input. The output layer ($3^{rd}$ Layer) is the last layer and plays a role to output a training value that is the results of learning. In an aspect of the present disclosure, difference values of the 16 gray level, the 32 gray level, the 64 gray level, and the 128 gray level are input to the input layer ($1^{st}$ Layer). The output layer ($3^{rd}$ Layer) outputs the first training value of the 192 gray level.

In the multilayer perceptron, adjacent layers may be connected by connection lines. A different weight may be applied to each connection line.

The input layer ($1^{st}$ Layer) and the middle layer (hidden layer) ($2^{nd}$ Layer) may have a plurality of different nodes. The output layer ($3^{rd}$ Layer) may have a node for an output. The nodes of each layer are perceptrons. In FIG. 7, the nodes of the input layer ($1^{st}$ Layer) are indicated as "1H1 to 1Hn, the nodes of the middle layer ($2^{nd}$ Layer) are indicated as 2H1 to 2Hn, and the nodes of the output layer ($3^{rd}$ Layer) are indicated as Hi. In FIG. 7, X0 to X3 indicate training inputs. Difference values of the 16 gray level, the 32 gray level, the 64 gray level, and the 128 gray level are indicated in accordance with the training inputs X0 to X3, respectively. Furthermore, Yp may be understood as corresponding to a training value.

The multilayer perceptron learns a pair of an input and output of learning data. Such a multilayer perceptron has information on which value needs to be output when an input is given, and does not have information on which value needs to be output with respect to the middle layer.

The multilayer perceptron generates an output while sequentially calculating for each layer in a forward direction when an input is given.

To this end, the input layer ($1^{st}$ Layer) has the plurality of nodes 1H1 to 1Hn. Each of the plurality of nodes 1H1 to 1Hn has connection lines to which difference values of the 16 gray level, the 32 gray level, the 64 gray level, and the 128 gray level for the training inputs are input. Different weights are applied to the connection lines, respectively. Each of the nodes of the input layer ($1^{st}$ Layer) may have an output corresponding to the sum of all the inputs multiplied by different weights. The outputs of the nodes of the input layer ($1^{st}$ Layer) may be transferred to the middle layer ($2^{nd}$ Layer).

The middle layer ($2^{nd}$ Layer) may have the number of nodes that is equal to or different from the number of nodes of the input layer ($1^{st}$ Layer). Each of the nodes of the middle layer ($2^{nd}$ Layer) has connection lines to which the outputs of all the nodes of the input layer ($1^{st}$ Layer) are input. Different weights are applied to the connection lines, respectively. Each of the nodes of the middle layer ($2^{nd}$ Layer) may have an output corresponding to the sum of all the inputs multiplied by different weights. The outputs of all the nodes of the middle layer ($2^{nd}$ Layer) may be transferred to the output layer ($3^{rd}$ Layer).

The output layer ($3^{rd}$ Layer) may have the node Hi. The node Hi of the output layer ($3^{rd}$ Layer) has connection lines to which all the outputs of the middle layer ($2^{nd}$ Layer) are input. Different weights are applied to the connection lines, respectively. The node Hi of the output layer ($3^{rd}$ Layer) may have an output corresponding to the sum of all the inputs multiplied by different weights. The output of the output layer ($3^{rd}$ Layer) may be understood as the training value Yp.

In the multilayer perceptron, learning is to determine a weight between the input layer ($1^{st}$ Layer) and the middle layer ($2^{nd}$ Layer) and a weight between the middle layer ($2^{nd}$ Layer) and the output layer ($3^{rd}$ Layer) so that learning data corresponding to inputs is output.

In step S21 for the first extrapolation, when the first training value Yp that is close to the difference value of the 192 gray level, that is, a target value with a difference within a preset error range, is calculated through the training, the first weights of the inputs to the nodes applied between the layers of the multilayer perceptron that has generated the first training value Yp may be stored as the results of learning.

Thereafter, in step S22 for the first extrapolation, the first estimation difference value of the first estimation gray level may be generated by using a multilayer perceptron method to which the learnt first weights have been applied.

To this end, the known difference values of the 32 gray level, the 64 gray level, the 128 gray level, and the 192 gray level may be used as inputs to the multilayer perceptron. The first weights stored as the results of the learning may be applied between the input layer ($1^{st}$ Layer) and the middle layer ($2^{nd}$ Layer) and between the middle layer ($2^{nd}$ Layer) and the output layer ($3^{rd}$ Layer). As a result, an estimation difference value of the 255 gray level, that is, the first estimation difference value of the first estimation gray level, may be generated by the multilayer perceptron using the known difference values of the 32 gray level, the 64 gray level, the 128 gray level, and the 192 gray level that are inputs.

The first estimation difference value of the first estimation gray level may be generated by using the first weights calculated through the training, through the first extrapolation of step S21 and step S22.

For the second extrapolation, step S23 and step S24 may be performed. The second extrapolation is to calculate a second estimation difference value of a second estimation gray level lower than selected gray levels, that is, the 0 gray level, based on known difference values of the selected gray levels.

The second extrapolation may be described with reference to FIGS. 6 and 7.

Figure 6:
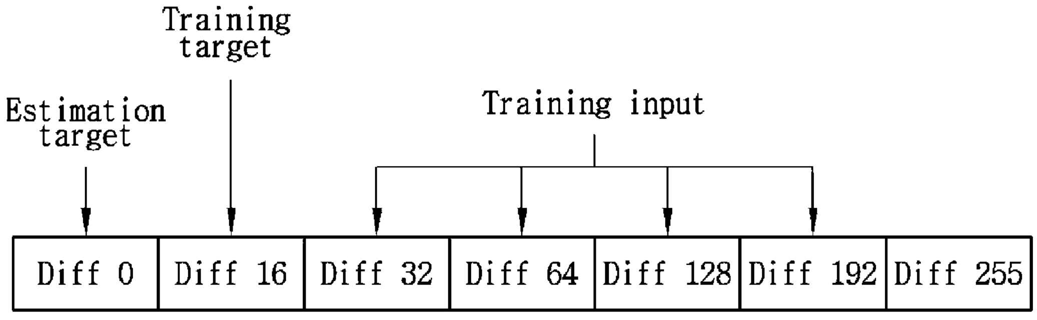
FIG. 6 is a diagram for describing second extrapolation.

In FIG. 6, a 16 gray level, that is, the lowest gray level in selected gray levels, may be set as a second selection gray level. In the gray level range, a 0 gray level may be set as a second estimation gray level. A difference value of the 16 gray level may be used as a training target, and may be set as a target value for training. Furthermore, difference values of the remaining selected gray levels, that is, a 32 gray level, a 64 gray level, a 128 gray level, and a 192 gray level, may be used as training inputs. Furthermore, the second estimation difference value of the 0 gray level is used as an estimation target.

In step S23 for the second extrapolation, the difference value of the 16 gray level among the selected gray levels is set as a first target value. A second training value of the 16 gray level is calculated by using a multilayer perceptron method that uses the difference values of the remaining selected gray levels as training inputs.

In the second extrapolation, the known difference values of the 32 gray level, the 64 gray level, the 128 gray level, and the 192 gray level are used as training inputs for a multilayer perceptron. The second training value of the 16 gray level is calculated through the multilayer perceptron. The multilayer perceptron is for calculating the second training value that is close to the known difference value of the 16 gray level with a difference within a preset error range.

In the second extrapolation, when the second training value that is close to the difference value of the 16 gray level, that is, a target value with a difference within a preset error range, is calculated through the training, second weights of inputs to nodes for each layer of the multilayer perceptron that has generated the second training value may be stored.

The multilayer perceptron of the second extrapolation may be understood based on the description given with reference to FIGS. 4 and 6, and a detailed description thereof is omitted.

In step S23 for the second extrapolation, when the second training value Yp that is close to the difference value of the 16 gray level, that is, a target value with a difference within a preset error range, is calculated through the training, the second weights of the inputs to the nodes applied between the layers of the multilayer perceptron that has generated the second training value Yp may be stored as the results of learning.

Thereafter, in step S24 for the second extrapolation, the second estimation difference value of the second estimation gray level may be generated by using a multilayer perceptron method to which the learnt second weights have been applied.

To this end, the known difference values of the 16 gray level, the 32 gray level, the 64 gray level, and the 128 gray level may be used as inputs to the multilayer perceptron. The second weights stored as the results of the learning may be applied between the input layer ($1^{st}$ Layer) and the middle layer ($2^{nd}$ Layer) and between the middle layer ($2^{nd}$ Layer) and the output layer ($3^{rd}$ Layer). As a result, an estimation difference value of the 0 gray level, that is, the second estimation difference value of the second estimation gray level, may be generated by the multilayer perceptron that uses the known difference values of the 16 gray level, the 32 gray level, the 64 gray level, and the 128 gray level as inputs thereof.

An estimation difference value of a 255 gray level and the estimation difference value of the 0 gray level may be generated by the extrapolation of step S21 to step S24. That is, the first estimation difference value of the first estimation gray level and the second estimation difference value of the second estimation gray level may be generated.

Thereafter, according to an aspect of the present disclosure, step S25 of generating a lookup table may be performed.

The lookup table is constituted with compensation data. Compensation data according to an aspect of the present disclosure may be generated as the results of the fitting of the mura compensation equation in step S16.

Compensation data may be generated by fitting the mura compensation equation so that estimation difference values of extension gray levels and difference values of selected gray levels are satisfied in step S16. In this case, the compensation data may include coefficient values of the mura compensation equation. The coefficient values may be determined so that the mura compensation equation has been fit to have a curve that satisfies the known difference values of the selected gray levels, the first estimation difference value of the first estimation gray level, and the second estimation difference value of the second estimation gray level.

The aforementioned compensation data may be constructed in the form of a lookup table in which the coefficient values for each gray level are matched for each pixel.

Figure 8:
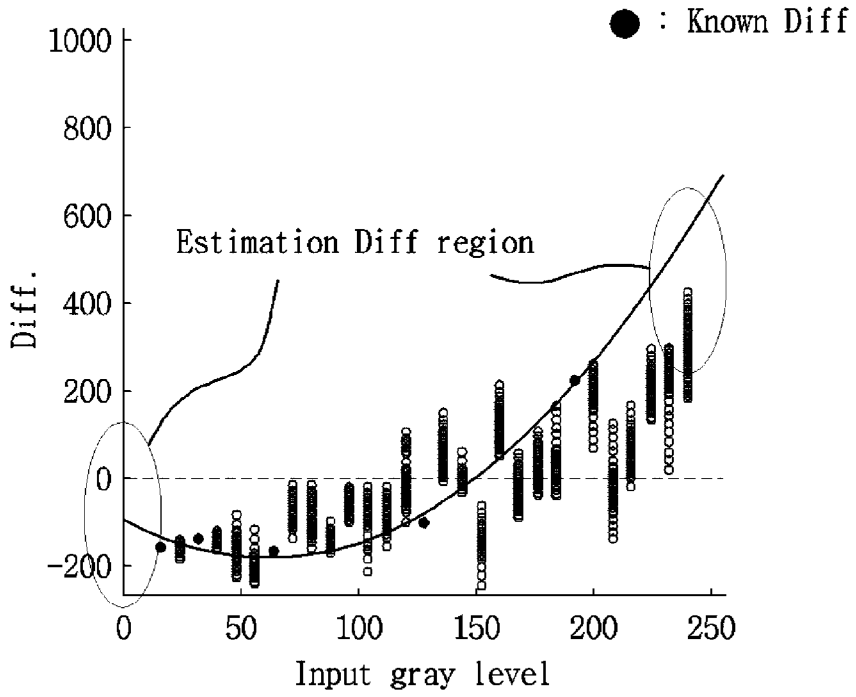
FIG. 8 is a graph illustrating a mura compensation equation according to a common mura compensation method.

FIG. 8 is a graph illustrating a mura compensation equation according to a common mura compensation method. FIG. 8 is an implementation of a curve for mura compensations using known difference values of selected gray levels. Accordingly, compensation values of a minimum gray level and gray levels around the minimum gray level, and compensation values of a maximum gray level and gray levels around the maximum gray level are illustrated as being quite different from difference values of brightness that are necessary for actual mura compensations.

Figure 9:
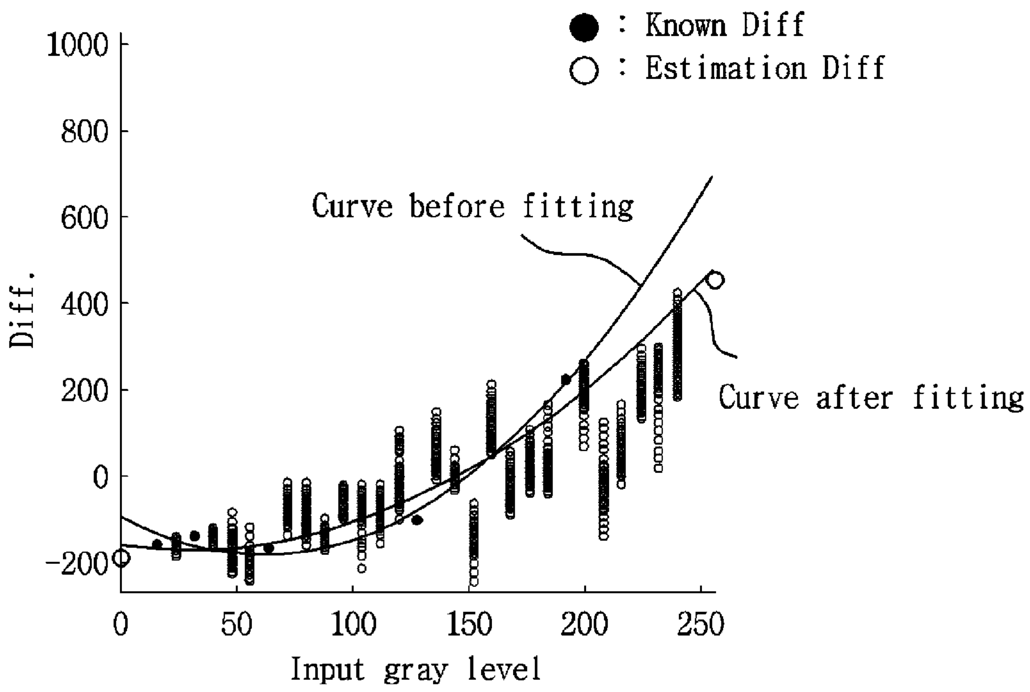
FIG. 9 is a graph illustrating a mura compensation equation according to a mura compensation method of the present disclosure.

According to the present disclosure, a curve that has been fit as in FIG. 9 may be obtained by assuming that a minimum gray level, gray levels around the minimum gray level, a maximum gray level, and gray levels around the maximum gray level are estimation Diff regions as in FIG. 8 and calculating estimation difference values of the maximum gray level and the minimum gray level.

FIG. 9 illustrates a curve before a mura compensation equation is fit and a curve after the mura compensation equation is fit. It may be understood that the curve after the fitting is represented by a mura compensation equation having coefficient values calculated by using estimation difference values.

Accordingly, according to the present disclosure, as in FIG. 9, compensation values of a minimum gray level and gray levels around the minimum gray level, and compensation values of a maximum gray level and gray levels around the maximum gray level are not quite different from a difference value of brightness that is necessary for actual mura compensations.

Accordingly, according to the present disclosure, it is possible to obtain accurate mura compensation data for all gray levels and to significantly improve mura compensation performance.

It will be apparent to those skilled in the art that various modifications and variations can be made in the display driving apparatus having a mura compensation function for compensating and a method of compensating for mura of the same of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display apparatus having a mura compensation function, comprising:

a mura memory in which compensation data corresponding to coefficient values of a mura compensation equation is stored; and a mura compensation circuit configured to perform mura compensations on display data by using the mura compensation equation to which the compensation data has been applied, wherein the coefficient values are set so that the mura compensation equation has been fit to have a curve that satisfies difference values of selected gray levels, a first estimation difference value of a first estimation gray level higher than the selected gray levels, and a second estimation difference value of a second estimation gray level lower than the selected gray levels, and wherein the compensation data comprises the coefficient values of the mura compensation equation in which all of the difference values of the selected gray levels, the first estimation difference value, and the second estimation difference value have a difference within a preset error range.

2. The display apparatus of claim 1, wherein the first estimation difference value and the second estimation difference value are generated through extrapolation which uses the difference values of the selected gray levels by using a multilayer perceptron method.

3. The display apparatus of claim 1, wherein the first estimation difference value is a value generated through first extrapolation, and the second estimation difference value is a value generated through second extrapolation, wherein the first extrapolation is configured to:

set a first difference value of a first selection gray level that is highest, among the selected gray levels, as a first target value, and calculate a first training value of the first selection gray level based on the difference values of remaining selected gray levels by using a multilayer perceptron method, store first weights for nodes for each layer of the multilayer perceptron method of generating the first training value close to the first target value in a way to satisfy the first target value, and generate the first estimation difference value of the first estimation gray level by using the multilayer perceptron method to which the first weights have been applied, and wherein the second extrapolation is configured to:

set a second difference value of a second selection gray level that is lowest, among the selected gray levels, as a second target value, and calculate a second training value of the second selection gray level based on the difference values of remaining selected gray levels by using a multilayer perceptron method, store second weights for nodes for each layer of the multilayer perceptron method of generating the second training value close to the second target value in a way to satisfy the second target value, and generate the second estimation difference value of the second estimation gray level by using the multilayer perceptron method to which the second weights have been applied.

4. The display apparatus of claim 3, wherein the first training value close to the first target value in a way to satisfy the first target value has a difference within a preset first error range on the basis of the first target value, and wherein the second training value close to the second target value in a way to satisfy the second target value has a difference within a preset second error range on the basis of the second target value.

5. The display apparatus of claim 1, wherein the first estimation gray level is a maximum gray level in a gray level range, and wherein the second estimation gray level is a minimum gray level in the gray level range.

6. A display apparatus having a mura compensation function, comprising:

a mura memory in which compensation data corresponding to coefficient values of a mura compensation equation is stored; and a mura compensation circuit configured to perform mura compensations on display data by using the mura compensation equation to which the compensation data has been applied, wherein the coefficient values are set so that the mura compensation equation has been fit to have a curve that satisfies difference values of selected gray levels, a first estimation difference value of a first estimation gray level higher than the selected gray levels, and a second estimation difference value of a second estimation gray level lower than the selected gray levels, and wherein the first estimation difference value and the second estimation difference value are generated through extrapolation which uses the difference values of the selected gray levels by using a multilayer perceptron method.

7. A display apparatus, comprising:

a mura memory in which data related to a mura compensation equation is stored; and a mura compensation circuit configured to perform mura compensations on display data by using the mura compensation equation, wherein the mura compensation equation is modified after being generated based on difference values of selected gray levels due to mura, and wherein the modified mura compensation equation is obtained based on estimation difference values and the difference values of the selected gray levels, the estimation difference values being for extension gray levels which are not included in the range of the selected gray levels from the lowest to the highest in the selected gray levels.

8. The display apparatus of claim 7, wherein the estimation difference values include a first estimation difference value and a second estimation difference value, the first estimation difference value being for a first estimation gray level higher than the selected gray levels among the extension gray levels, the second estimation difference value being for a second estimation gray level lower than the selected gray levels among the extension gray levels.

9. The display apparatus of claim 8, wherein the mura compensation circuit obtains:

the estimation difference values through a machine learning;

the first estimation difference value by setting a difference value of a first selected gray level which is the highest among the selected gray levels as a first target value, obtaining a first training value of the first selected gray level which is within a preset error range of the first target value through the machine learning, and applying learning results for the first training value to the machine learning; and the second estimation difference value by setting a difference value of a second selected gray level which is the lowest among the selected gray levels as a second target value, obtaining a second training value of the second selected gray level which is within a preset error range of the second target value through the machine learning, and applying the learning results for the second training value to the machine learning.

10. The display apparatus of claim 9, wherein the mura compensation circuit obtains:

the first training value by using the difference values of the selected gray levels excluding the first selected gray level as input values for the machine learning; and the second training value by using the difference values of the selected gray levels excluding the second selected gray level as input values for the machine learning.

11. The display apparatus of claim 9, wherein the mura compensation circuit calculates:

the first estimation difference value based on the difference values of the selected gray levels and first weights of the machine learning, wherein the first weights are related to generation of the first training value and are stored in the mura memory as the learning results for the first training value; and the second estimation difference value based on the difference values of the selected gray levels and second weights of the machine learning, wherein the second weights are related to generation of the second training value and are stored in the mura memory as the learning results for the second training value.

12. The display apparatus of claim 9, wherein the machine learning uses a multi-layer perceptron.

13. The display apparatus of claim 12, wherein the mura compensation circuit calculates:

the first estimation difference value by using the difference values of the selected gray levels as input values of the multi-layer perceptron and applying first weights to the multi-layer perceptron, wherein the first weights are used to generate the first training value in the multi-layer perceptron and are stored in the mura memory as the learning results for the first training value; and the second estimation difference value by using the difference values of the selected gray levels as input values of the multi-layer perceptron and applying second weights of the multi-layer perceptron to the multi-layer perceptron, wherein the second weights are used to generate the second training value in the multi-layer perceptron and are stored in the mura memory as the learning results for the second training value.

14. A mura compensation method, comprising:

obtaining difference values of selected gray levels due to mura;

generating a mura compensation equation based on the difference values;

obtaining estimation difference values for extension gray levels which are not included in the range of the selected gray levels from the lowest to the highest in the selected gray levels; and modifying the mura compensation equation based on the estimation difference values of the extension gray levels and the difference values of the selected gray levels.

15. The mura compensation method of claim 14, wherein the obtaining estimation difference values comprises:

obtaining a first estimation difference value for a first estimation gray level higher than the selected gray levels among the extension gray levels; and obtaining a second estimation difference value for a second estimation gray level lower than the selected gray levels among the extension gray levels.

16. The mura compensation method of claim 15, wherein the obtaining estimation difference values is performed through machine learning;

wherein the obtaining the first estimation difference value comprises:

setting a difference value of a first selected gray level which is the highest among the selected gray levels as a first target value;

obtaining a first training value of the first selected gray level which is within a preset error range of the first target value through the machine learning; and generating the first estimation difference value by applying the learning results for the first training value to the machine learning; and wherein the obtaining the second estimation difference value comprises:

setting a difference value of a second selected gray level which is the lowest among the selected gray levels as a second target value;

obtaining a second training value of the second selected gray level which is within a preset error range of the second target value through the machine learning; and generating the second estimation difference value by applying the learning results for the second training value to the machine learning.

17. The mura compensation method of claim 16, wherein the first training value is obtained by using the difference values of the selected gray levels excluding the first selected gray level as input values for the machine learning, and wherein the second training value is obtained by using the difference values of the selected gray levels excluding the second selected gray level as input values for the machine learning.

18. The mura compensation method of claim 16, wherein the generating the first estimation difference value by applying the learning results comprises:

storing first weights as the learning results for the first training value, wherein the first weights are related to generation of the first training value; and calculating the first estimation difference value based on the difference values of the selected gray levels and the first weights; and wherein the generating the second estimation difference value by applying the learning results comprises:

storing second weights as the learning results for the second training value, wherein the second weights are related to generation of the second training value; and calculating the second estimation difference value based on the difference values of the selected gray levels and the second weights.

19. The mura compensation method of claim 16, wherein the machine learning uses a multi-layer perceptron.

20. The mura compensation method of claim 19, wherein the generating the first estimation difference value by applying the learning results comprises:

storing first weights as the learning results for the first training value, wherein the first weights are used to generate the first training value in the multi-layer perceptron; and calculating the first estimation difference value by using the difference values of the selected gray levels as input values of the multi-layer perceptron and by applying the first weights to the multi-layer perceptron; and wherein the generating the second estimation difference value by applying the learning results comprises:

storing second weights as the learning results for the second training value, wherein the second weights are used to generate the second training value in the multi-layer perceptron; and calculating the second estimation difference value by using the difference values of the selected gray levels as input values of the multi-layer perceptron and by applying the second weights to the multi-layer perceptron.

* * * * *